United States Patent
Conklin et al.

(10) Patent No.: US 6,363,378 B1
(45) Date of Patent: Mar. 26, 2002

(54) RANKING OF QUERY FEEDBACK TERMS IN AN INFORMATION RETRIEVAL SYSTEM

(75) Inventors: James Conklin, Scotts Valley; Mohammad Faisal, San Mateo, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/170,894

(22) Filed: Oct. 13, 1998

(51) Int. Cl.[7] ............................................. G06F 17/30
(52) U.S. Cl. .............................. 707/5; 707/3; 707/531; 707/60; 706/45; 704/9
(58) Field of Search .......................... 707/3, 5, 10, 531, 707/60; 706/45; 704/9

(56) References Cited

U.S. PATENT DOCUMENTS

| | | | | |
|---|---|---|---|---|
| 5,418,717 A | * | 5/1995 | Su et al. ......................... | 704/9 |
| 5,708,822 A | * | 1/1998 | Wical ............................ | 704/1 |
| 5,893,092 A | * | 4/1999 | Driscoll ......................... | 707/5 |
| 6,026,388 A | * | 2/2000 | Liddy et al. .................... | 707/1 |

* cited by examiner

Primary Examiner—Thomas Black
Assistant Examiner—Charles L. Rones
(74) Attorney, Agent, or Firm—Stattler Johansen & Adeli LLP (57) ABSTRACT

An information retrieval system processes user input queries, and identifies query feedback, including ranking the query feedback, to facilitate the user in re-formatting a new query. A knowledge base, which comprises a plurality of nodes depicting terminological concepts, is arranged to reflect conceptual proximity among the nodes. The information retrieval system processes the queries, identifies topics related to the query as well as query feedback terms, and then links both the topics and feedback terms to nodes of the knowledge base with corresponding terminological concepts. At least one focal node is selected from the knowledge base based on the topics to determine a conceptual proximity between the focal node and the query feedback nodes. The query feedback terms are ranked based on conceptual proximity to the focal node. A content processing system that identifies themes from a corpus of documents for use in query feedback processing is also disclosed.

12 Claims, 8 Drawing Sheets

RANKING OF QUERY FEEDBACK TERMS IN AN INFORMATION RETRIEVAL SYSTEM

BACKGROUND OF THE INVENTION

1. Field of the Invention

The present invention is directed toward the field of information retrieval systems, and more particularly towards ordering or ranking query feedback presented to a user.

2. Art Background

An information retrieval system attempts to match user queries (i.e., the users statement of information needs) to locate information available to the system. In general, the effectiveness of information retrieval systems may be evaluated in terms of many different criteria including execution efficiency, storage efficiency, retrieval effectiveness, etc. Retrieval effectiveness is typically based on document relevance judgments. These relevance judgments are problematic since they are subjective and unreliable. For example, different judgment criteria assigns different relevance values to information retrieved in response to a given query.

There are many ways to measure retrieval effectiveness in information retrieval systems. The most common measures used are "recall" and "precision." Recall is defined as the ratio of relevant documents retrieved for a given query over the number of relevant documents for that query available in the repository of information. Precision is defined as the ratio of the number of relevant documents retrieved over the total number of documents retrieved. Both recall and precision are measured with values ranging between zero and one. An ideal information retrieval system has both recall and precision values equal to one.

One method of evaluating the effectiveness of information retrieval systems involves the use of recall-precision graphs. A recall-precision graph shows that recall and precision are inversely related. Thus, when precision goes up recall typically goes down and vice-versa. Although the goal of information retrieval systems is to maximize precision and recall, most existing information retrieval systems offer a trade-off between these two goals. For certain users, high recall is critical. These users seldom have means to retrieve more relevant information easily. Typically, as a first choice, a user seeking high recall may expand their search by broadening a narrow boolean query or by looking further down a ranked list of retrieved documents. However, this technique typically results in wasted effort because a broad boolean search retrieves too many unrelated documents, and the tail of a ranked list of documents contains documents least likely to be relevant to the query.

Another method to increase recall is for users to modify the original query. However, this process results in a random operation because a user typically has made his/her best effort at the statement of the problem in the original query, and thus is uncertain as to what modifications may be useful to obtain a better result.

For a user seeking high precision and recall, the query process is typically a random iterative process. A user starts the process by issuing the initial query. If the number of documents in the information retrieval system is large (e.g., a few thousand), the hit-list due to the initial query does not represent the exact information the user intended to obtain. Thus, it is not just the non-ideal behavior of information retrieval systems responsible for the poor initial hit-lists, but the user also contributes to degradation of the system by introducing error. User error manifests itself in several ways. One way user error manifests itself is when the user does not know exactly what he/she is looking for, or the user has some idea what he/she is looking for but doesn't have all the information to specify a precise query. An example of this type of error is one where the user is looking for information on a particular brand of computer but does not remember the brand name. For this example, the user may start by querying for "computers." A second way user error manifests itself is when the user is looking for some information generally interesting to the user but can only relate this interest via a high level concept. An on-line world wide web surfer is an example of such a user. For example, the user may wish to conduct research on recent issues related to "Middle East", but does not know the recent issues to search. For this example, if a user simply does a search on "Middle East", then some documents relevant to the user, which deal with current issues in the "petroleum industry", will not be retrieved.

Another problem in obtaining high recall and precision is that users often input queries that contain terms that do not match the terms used to index the majority of the relevant documents and almost always some of the unretrieved relevant documents (i.e., the unretrieved relevant documents are indexed by a different set of terms than those used in the input query). This problem has long been recognized as a major difficulty in information retrieval systems. See Lancaster, F. W. 1969. "MEDLARS: Reports on the Evaluation of its Operating Efficiency." American documentation, 20(1), 8–36.

Prior art query feedback systems, used to supplement replaced terms in the original query, are an attempt to improve recall and/or precision in information retrieval systems. In these prior art systems, the feedback terms are often generated through statistical means (i.e., co-occurrence). Typically, in co-occurrence techniques, a set of documents in a database is examined to identify patterns that "co-occur." For example, if in a particular document set, the term "x" is frequently found near the term "y," then term "y" is provided as a feedback term for a query that contains term "x." Thus, co-occurrence techniques identify those terms having a physical proximity in a document set. Unfortunately, physical proximity in the document set does not always indicate that the terms connote similar concepts (i.e., physical proximity is a poor indicator of conceptual proximity).

Once the feedback terms are identified through statistical means, the terms are displayed, on an output display, to help direct the user to reformulate a new query. Typically, the feedback terms are ranked (i.e., listed in an order) using the same measure of physical proximity originally used to identify the feedback terms. For example, if term "y" appears physically closer to term "x" than term "z," then term "y" is ranked or listed before term "z." Since physical proximity is often a poor indicator of conceptual proximity, this technique of ranking query feedback terms is poor. Therefore, it is desirable to implement a query feedback technique in an information retrieval system that does not utilize statistical or co-occurrence methods. In addition, to the extent that the statistical ranking methods generate a useful order, these methods are only suitable when statistical methods are used to identify query feedback terms. Accordingly, it is also desirable to utilize query feedback ranking techniques with a more general methodology applicable to all types of systems that generate query feedback.

SUMMARY OF THE INVENTION

An information retrieval system processes user input queries, and identifies query feedback, including ranking the query feedback, to facilitate the user in re-formatting a new query The information retrieval system includes a knowledge base that comprises a plurality of nodes, depicting terminological concepts, arranged to reflect conceptual proximity among the nodes. The information retrieval system processes the queries to identify a document hit list related to the query, and to generate query feedback terms. Each document includes a plurality of themes or topics that describes the overall thematic content of the document. The topics or themes are then mapped or linked to corresponding nodes of the knowledge base. At least one focal node is selected from the knowledge base, wherein a focal point node represents a concept, as defined by the relationships in the knowledge base, conceptually most representative of the topics or themes. The query feedback terms are also mapped or linked to nodes of the knowledge base. To identify a ranking for the query feedback terms, the information retrieval system determines a conceptual proximity between the focal nodes and the nodes that represent the query feedback terms, and ranks the query feedback terms from a first term closest in conceptual proximity to the focal nodes to a last term furthest in conceptual proximity from the focal nodes. The query feedback terms are then displayed to the user in the order ranked.

In one embodiment, to process the query, the information retrieval system selects a plurality of documents relevant to said query, and then selects one or more themes from said documents, wherein said themes define at least a portion of the thematic content of said documents. Thus, for this embodiment, the topics are the themes from the document hit list.

DETAILED DESCRIPTION

Information Retrieval System

Figure 1:
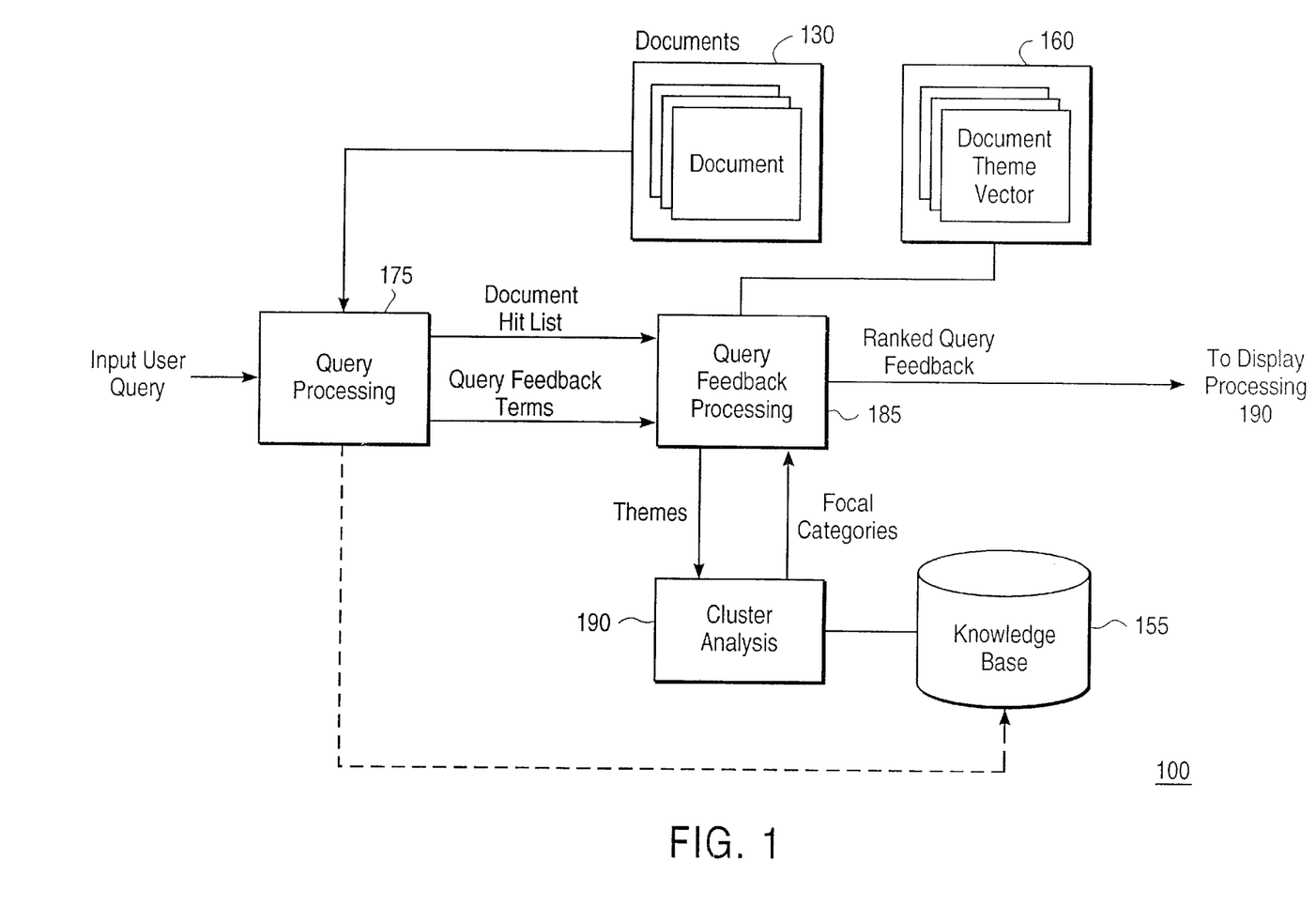
FIG. 1 is a block diagram illustrating one embodiment for the information retrieval system of the present invention.

FIG. 1 is a block diagram illustrating one embodiment for the information retrieval system of the present invention. In general, the information retrieval system 100 receives, as input, a user input query and generates, as output, search results including the ranked query feedback of the present invention and a document hit list. The user input query may consist of either words, phrases or sentences.

For this embodiment, input user queries are processed in the query processing 175. In one embodiment, the query processing 175 processes theme queries and text queries.

For theme queries, the query processing 175 processes the input user query to identify the thematic content of the query. Specifically, a content processing system 110 (FIG. 7) analyzes the words or terms in the query to generate a query theme vector. In general, the query theme vector presents a thematic profile of the content in the query. A further discussion of theme vectors is described more fully below in the section "Content Processing System."

Figure 7:
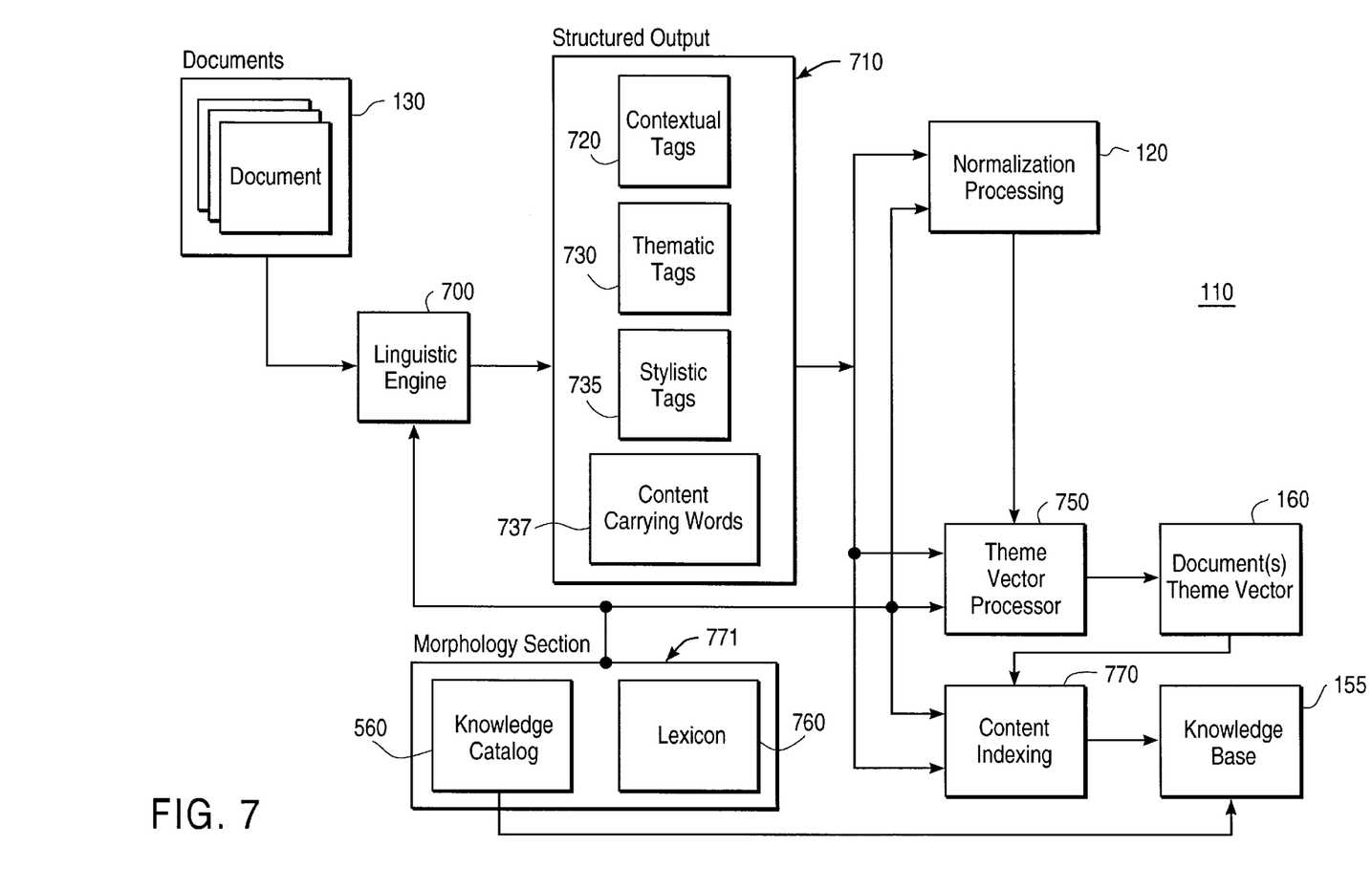
FIG. 7 is a block diagram illustrating one embodiment for a content processing system.

For text queries, the query processing 175 does not analyze the text to ascertain the thematic content (i.e., identify themes), but instead uses the query terms, and their linguistic variants, to process the query. To process text queries, the information retrieval system utilizes normalization processing 120 (FIG. 7). In normalization processing 120, information is extracted from morphology section 770 (FIG. 7) to identify the linguistic variants for the terms in the input query. The normalization processing 120 and morphology section 770 is described more fully below in the section "Content Processing System."

The information retrieval system 100 is cataloged with one or more documents, labeled documents 130 on FIG. 1. The documents 130 may include a compilation of information from any source. For example, the documents 130 may be information stored on a computer system as computer readable text. Also, the documents 130 may be accessed via a network, and stored at one or more remote locations. The content of the documents 130 may include articles, books, periodicals, etc.

The query processing 175 identifies one or more documents 130 in response to the input user query as the document hit list. As shown in FIG. 1, the query processing 175 outputs a "document hit list" responsive to the query. Although the query feedback of the present invention is described in conjunction with a system that identifies a document hit list, the invention may also be used in conjunction with a system that identifies any type of information that includes a plurality of topics responsive to the user query.

As shown in FIG. 1, the information retrieval system 100 includes document themes vector 160. The document themes vector 160 identifies themes for each individual document, as well as a theme strength corresponding to each theme. In addition to identifying document themes, each theme is classified. Specifically, the content processing system 110 uses a classification criteria, which in one embodiment includes categories or terminology arranged hierarchically, to classify document themes in one or more categories. The classifications for document themes are identified in the document themes vector 160.

Table 1 is an example document theme vector 160.

TABLE 1

| Document Theme Vector | | |
|---|---|---|
| Document Themes | Theme Strength | Classification Category |
| Theme$_1$ | 190 | (category$_a$) |
| Theme$_2$ | 110 | None |
| Theme$_3$ | 70 | (Category$_c$) |
| Theme$_4$ | 27 | (Category$_d$) |
| . | . | . |
| . | . | . |
| . | . | . |
| Theme$_n$ | 8 | (Category$_z$) |

As shown in Table 1, a document theme vector 160 for a document includes a list of document themes, indicated in Table 1 by $Theme_1$–$Theme_n$. Each theme has a corresponding theme strength. The theme strength is calculated in the theme vector processor 750 (FIG. 7). The theme strength is a relative measure of the importance of the theme to the overall content of the document. For this embodiment, the larger the theme strength, the more important the theme is to the overall content of the document. The document theme vector 160 lists the document themes from the most important to the least important themes (e.g., $theme_1$–$theme_n$).

The document theme vector 160 for each document further includes, for some themes, a category for which the theme is classified. The classification category is listed in the third column of the document theme vector shown in Table 1. For example, $theme_1$, is classified in $category_a$, and $theme_3$ is classified in $category_c$.

The information retrieval system 100 also utilizes a knowledge base, labeled 155 on FIG. 1. In general, the knowledge base 155 includes a plurality of nodes of categories, which represent concepts, expressed as terminology and arranged to reflect semantic, linguistic and usage associations among the categories. In one embodiment, the knowledge base 155 may contain classification and contextual information based on processing and/or compilation of thousands of documents or may contain information based on manual selection by a linguist. The contents, generation and use of the knowledge base 155 is described more fully below in section "The Knowledge Base."

As shown in FIG. 1, the information retrieval system 100 includes query feedback processing 185. The query feedback processing 185 receives, as input, the document hit list and query feedback terms and generates, as output, ranked query feedback terms for display on the user's output display (e.g., computer monitor). To generate the ranked query feedback, the query feedback processing 185 accesses document theme vectors 160 cluster analysis 190 and knowledge base 155.

The cluster analysis 190 receives, as input, themes from the query feedback processing 185 and generates, as output, focal categories or nodes. In general, themes, which includes a plurality of theme weights, are input to cluster analysis 190. In response, the cluster analysis 190 generates "focal categories" that reflect categories of the knowledge base most representative of the themes as depicted in the organization of categories in the knowledge base 155. The query feedback processing 185 uses the focal categories to measure conceptual proximity between the focal categories and the query feedback terms. This conceptual proximity measure is used to rank the query feedback (e.g., themes).

The query processing 185 outputs retrieval information, including the ranked query feedback terminology, to a screen module (not shown). In general, the screen module processes the ranked query feedback terms to display the terms in a predetermined form. A screen module, which processes information for display on a computer output display, is well known in the art and will not be described further.

One embodiment for generating query feedback terms for use in query feedback processing 185 is described in U.S. Pat. No. 6,094,652, issued on Jul. 25, 2000, entitled "Hierarchical Query Feedback in An Information Retrieval System," filed Jun. 10, 1998, inventor: Mohammad Faisal, which is expressly incorporated herein by reference.

One embodiment for generating document hit lists is described in U.S. patent application Ser. No. 08/861,961, (pending) entitled "A Document Knowledge Base Search and Retrieval System," filed May 21, 1997, inventor: Kelly Wical, which is expressly incorporated herein by reference.

Embodiments for Ranking Query Feedback Terms

Figure 2:
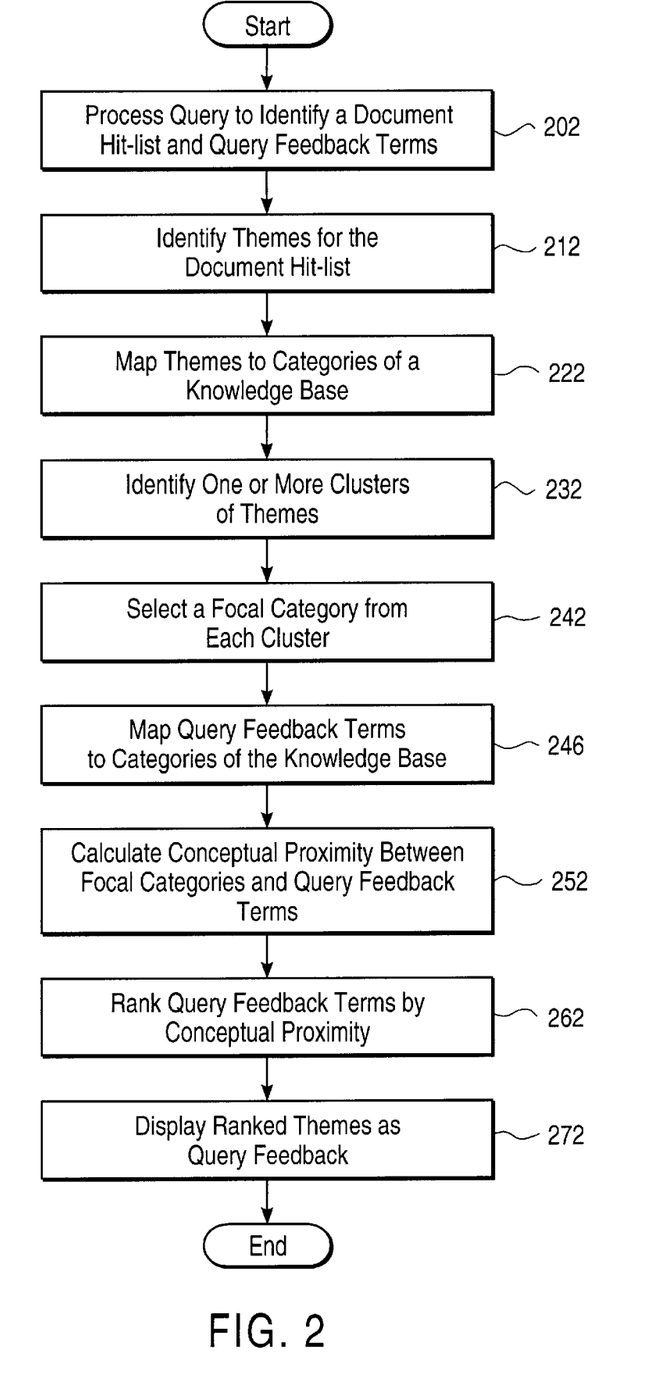
FIG. 2 is a flow diagram illustrating one embodiment of query feedback processing in accordance with the present invention.

FIG. 2 is a flow diagram illustrating one embodiment of query feedback processing in accordance with the present invention. The process is initiated by a user entering an input user query into the system (e.g., typing the query into a computer system). The information retrieval system 100 processes the query by identifying a "document hit list" and query feedback terms (query processing 175, FIG. 1), as shown in block 202. The document hit list defines a plurality of topics which the information retrieval system determines are related to the input user query. In a document-based system, the document hit list includes identifying multiple documents, wherein each document includes one or more themes or topics. As shown in block 212, themes or topics for the document hit list are identified. For the information retrieval system 100 of FIG. 1, the query feedback processing 185 accesses the document theme vector 160 to extract the topics or themes for each document in the document hit list. In one embodiment, the document themes 160 identifies the sixteen (16) most important themes for each document in the document hit list.

The themes are mapped or linked to categories of a knowledge base, as shown in block 222. The knowledge base 155 consists of a plurality of categories, arranged hierarchically, wherein each category represents a concept. For example, if one of the themes is "computer industry," then the theme "computer industry" is linked to the category "computer industry" in the knowledge base 155. Due to the normalization processing performed as part of the content processing (FIG. 7), the words/phrases for the themes are in the same form as words/phrases of the categories in the knowledge base.

To identify a focal category, the information retrieval system 100 identifies one or more clusters of themes, as they are linked in the knowledge base 155, as shown in block 232 of FIG. 2. For the information retrieval system 100 shown in FIG. 1, the "clustering" of themes or topics is performed by the cluster analysis 190. The arrangement of categories or concepts in the knowledge base represent semantic, linguistic or usage relationships among the concepts of an ontology. Thus, when the themes are mapped to categories of the knowledge base, the categories identified reflect a semantic, linguistic or usage association among the themes. These associations from the knowledge base are utilized to rank query feedback terminology. Although a knowledge base with hierarchically arranged categories is described for use with query feedback processing of the present invention, any information base that reflects associations among concepts or words may be used without deviating from the spirit or scope of the invention.

As shown in block 232, one or more clusters of themes are identified. In general, a cluster of themes is where a plurality of themes are located in relatively close conceptual proximity when linked in the knowledge base. The identification of theme clusters for use with ranking query feedback processing is described more fully below in conjunction with FIGS. 3, 4 and 5. As shown in block 242 of FIG. 2, a focal category is selected from each cluster. In general, a focal category or focal topic is a concept that best reflects the center of conceptual proximity of the themes or topics in a cluster. Accordingly, the focal category or topic is a single concept that best represents the thematic concepts of/in the cluster (i.e., themes).

As shown in block 246, the query feedback terms are mapped to categories of the knowledge base. For the embodiment that generates query feedback terms as described in U.S. Pat. No. 6,094,652, issued on Jul. 25, 2000, the query feedback terms are generated based on categories of the knowledge base. Alternatively, for other embodiments, the query feedback terms may undergo normalization processing 120 (FIG. 7) so that the form of the query feedback term matches the form of the category names in the knowledge base.

As shown in block 252 of FIG. 2, semantic proximity between focal categories and query feedback terms are calculated. The knowledge base 155 is organized to reflect semantic distances through levels of the hierarchy, as well as cross-references. In one embodiment, a quantitative value is ascribed to reflect a semantic distance between levels of the hierarchy and cross-references among categories. For example, the distance between a parent category and a child category in an ontology may represent a semantic distance of 1. For this embodiment, if a query feedback term is a grandchild category of the focal category, then that term receives a semantic distance of 2. One embodiment for calculating semantic proximity is described more fully below in the section "Semantic Proximity."

As shown in block 262, the query feedback terms are ranked by the semantic proximity. As shown in block 272 of FIG. 2, the query feedback terms are displayed (e.g., a computer display) in the order in which they were ranked.

Clustering Processing

Figure 3:
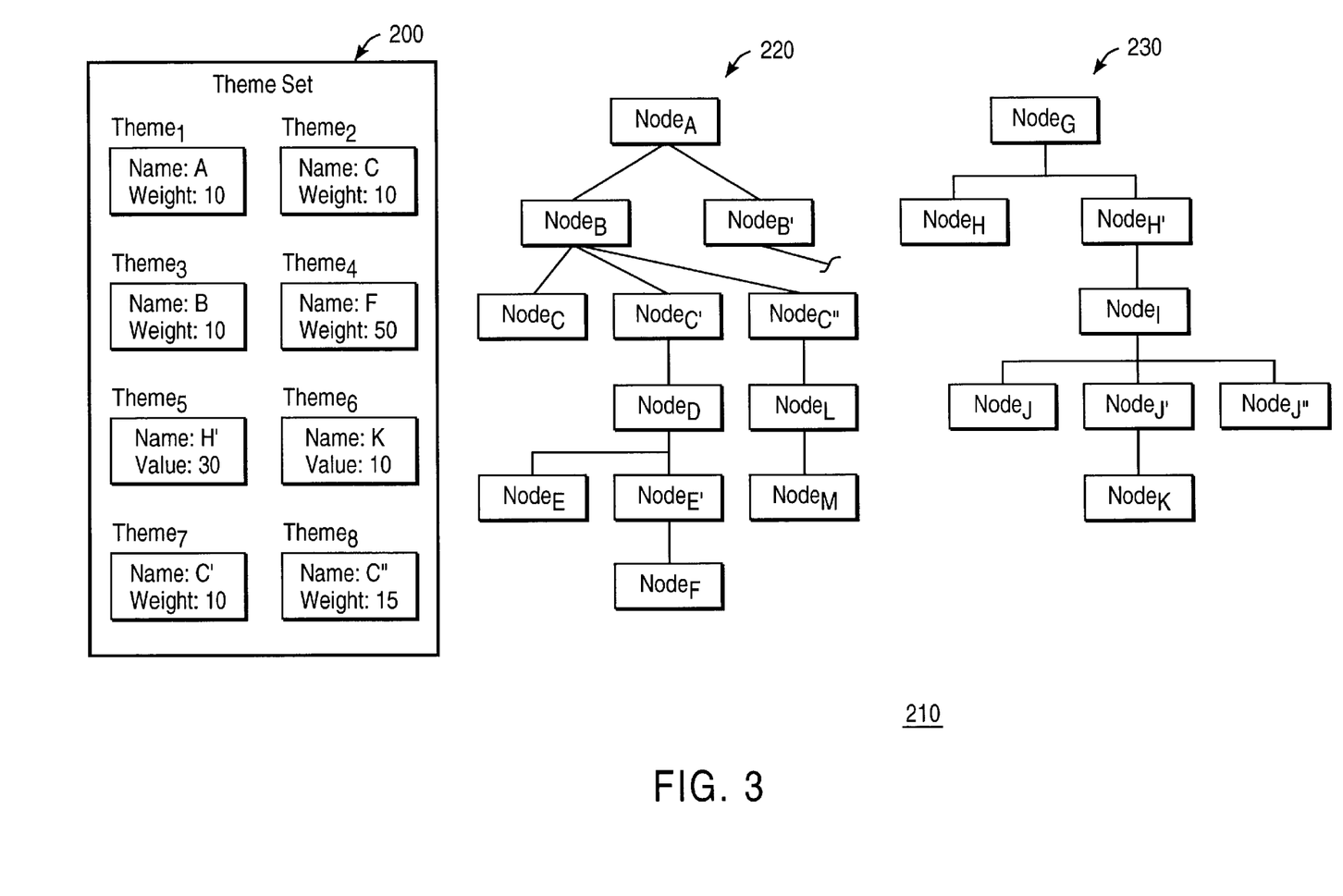
FIG. 3 illustrates an example of mapping terms to a portion of a knowledge base.

FIG. 3 illustrates an example of mapping themes to a portion of a knowledge base. Document themes 160 for a document hit list contains themes (theme$_1$, theme$_2$, . . . theme$_8$). Each theme includes a name to identify that theme. For purposes of explanation, the themes of document set 200 are designated A, B, C, F, H', K, C' and C". In addition, an theme includes a weight. In general, the theme weight provides a quantitative relative measure for the associated theme. For the example of FIG. 3, theme, has a weight of 10; theme$_2$ has a weight of 10; and theme$_3$ has a weight of 10, etc.

An example portion of a knowledge base is reproduced in FIG. 3, and labeled 210. Knowledge base 210 includes two independent ontologies, labeled 220 and 230. The ontology 220 contains node$_A$ as the highest level node in the hierarchy, and includes six levels total. Ontology 230, which includes five levels, contains node$_G$, in the highest level, and contains node$_K$ in the lowest level. As described more fully below, the nodes represent terms or concepts, and the hierarchical relationships among the concepts depict semantic, linguistic, and usage associations among those concepts.

For purposes of nomenclature, the knowledge base 210 includes both ancestor relationships and descendant relationships. An ancestral relationship includes all of those nodes linked to the subject node that appear higher in the hierarchy. For example, node$_D$ has an ancestral relationship to node$_{C'}$, node$_B$, and node$_A$. Descendant relationships for a subject node include all nodes beneath the subject node in a tree hierarchy. For example, node$_C$ has a descendant relationship with node$_D$, node$_{E'}$, node$_E$, and node$_F$. Also, nodes may be defined as having parent-child, grandparent-child, grandchild-child, etc. relationships. For example, node$_I$ is the grandchild node of node$_G$ in ontology 230.

Figure 4:
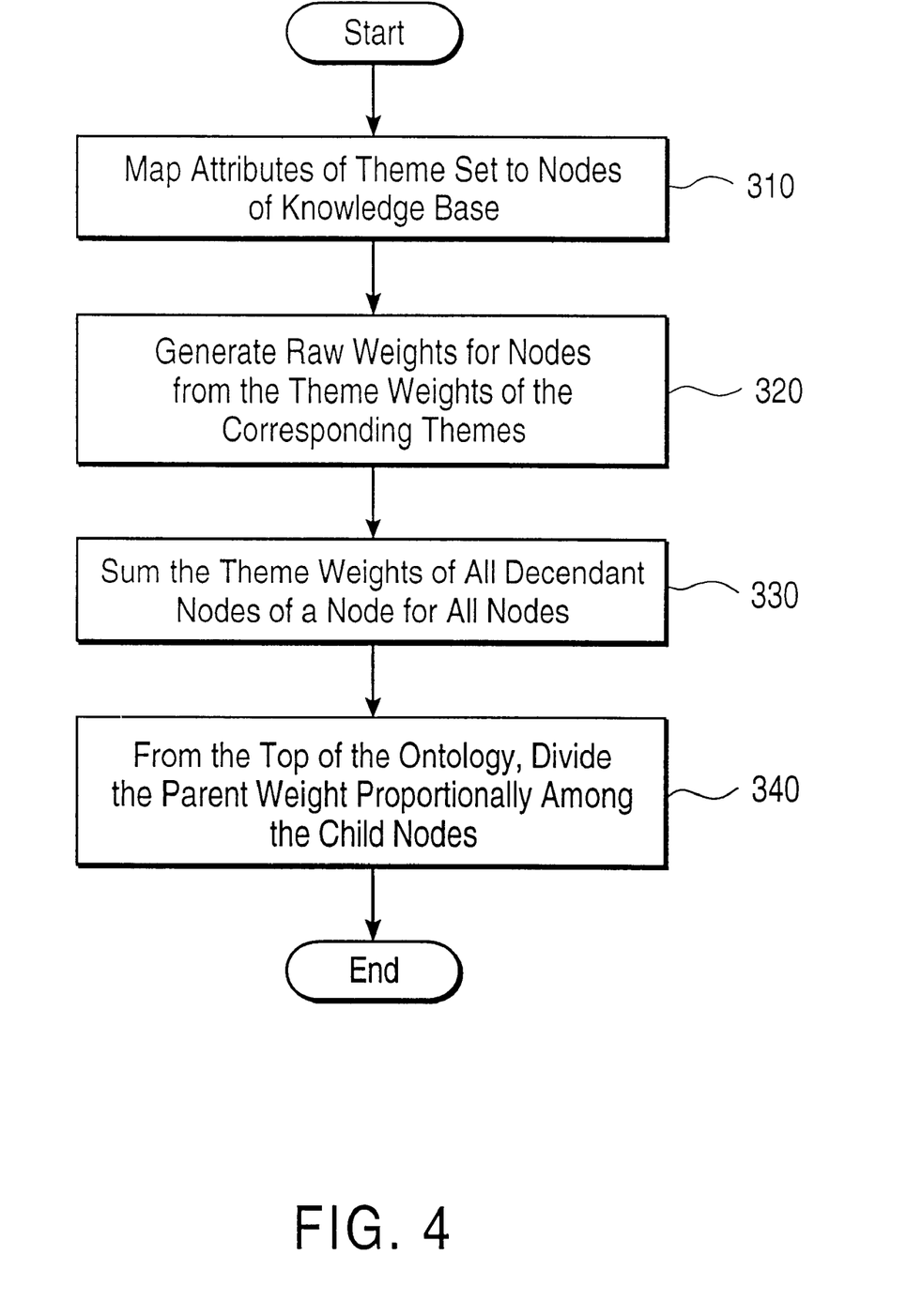
FIG. 4 is a flow diagram illustrating one embodiment for weight summing for use in the clustering analysis.

FIG. 4 is a flow diagram illustrating one embodiment for weight summing for use in the clustering analysis 190. As shown in block 310, themes of the document themes are mapped to nodes of the tree structure. Table 2 shows, for each cluster node (i.e., a node for which a theme is mapped), accumulated weights for the corresponding cluster nodes for the example document themes 200 of FIG. 3.

TABLE 2

| Theme Name | Value (Weight) |
| --- | --- |
| A | 10 |
| C | 20 |
| D | 10 |
| F | 50 |
| H' | 30 |
| K | 10 |
| C' | 10 |
| C" | 15 |

To map themes of a document to a tree structure, theme names are compared with node names to identify matches. For the example of FIG. 3, theme$_1$, named "A", is mapped to or associated with node$_A$ in ontology 220. Similarly, theme, is mapped to ontology 230 by associating the name "H'" with node$_H$. As shown in block 320 of FIG. 4, raw weights are generated for nodes from the weight values of the corresponding themes. This step includes ascribing the weights for each theme as a raw weight for the corresponding node. If the set of document themes contain two or more themes having the same name, then the raw weight is a sum of all of those theme weights. Table 2 shows, for each theme, the theme name, as mapped to the knowledge base, and a column for the corresponding weight for the example of FIG. 3.

In addition to accumulating raw weights, the cluster analysis 190 (FIG. 1) also calculates a descendant weight. As shown in block 330 of FIG. 4, weights of all descendant nodes for nodes selected are summed to generate a descendant weight. Table 3 shows, for each theme of example theme set 200, a descendant weight. Specifically, the descendant weight is determined by adding all of the raw weights for all of the child nodes as well as the raw weights for the descendants of the subject node. For example, a descendant weight of one hundred and five (105) for node$_A$ is calculated by summing weights for all of its descendants (i.e., 20+10+ 15+10+50 from node$_C$, node$_{C'}$, node$_{C''}$, node$_D$, and node$_F$, respectively). Table 3 shows, for each cluster node, the name associated with the node and its descendant weight.

TABLE 3

| Node Name | Descendant Weight |
| --- | --- |
| C' | 60 |
| C" | 0 |
| A | 105 |
| C | 0 |
| D | 50 |
| F | 0 |
| H | 10 |
| K | 0 |

As shown in block 340 of FIG. 4, an ancestor weight, which measures how much weight is from the ancestors of the subject node (i.e., the node under analysis), is calculated. In one embodiment, to calculate an ancestor weight, the parent weight (i.e., the raw weight plus the nodes parent weight) is divided proportionally among the child nodes based on the relative weight of the child nodes. Table 4 shows, for each node, the node name and corresponding ancestor weight.

TABLE 4

| Node Name | Ancestor Weight |
|---|---|
| C' | 6.7 |
| C" | 1.4 |
| A | 0 |
| C | 1.9 |
| D | 11.9 |
| F | 21.9 |
| H | 0 |
| K | 0 |

For the example of FIG. 3, $node_C$ has an ancestor weight of approximately 1.9, $node_{C'}$ has an ancestor weight of approximately 6.7, and $node_{C''}$ has an ancestor weight of approximately 1.4, from the raw weight of $node_A$. $Node_F$ has a total ancestor weight of 24.44 from the raw weight of $node_{C'}$ plus the ancestor weight of $node_{C'}$.

Accordingly, the output of weight summing provides three weights. A raw weight that represents the weight from the themes of the theme set for clustering; a descendant weight that measures the amount of weight from the descendants of a particular node; and an ancestor weight that measures the amount of weight from the ancestors of a particular node.

Figure 5:
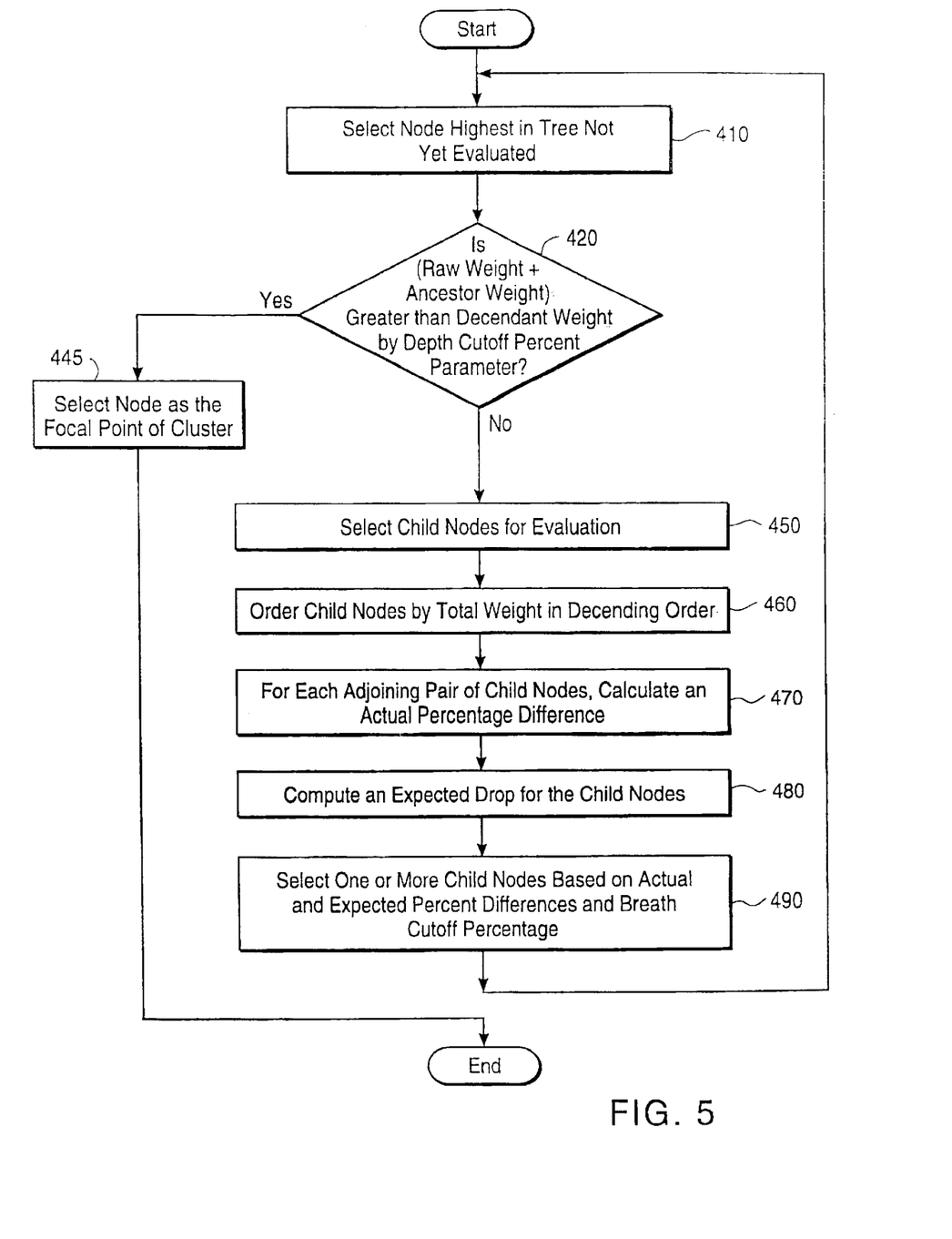
FIG. 5 is a flow diagram illustrating one embodiment for focal point selection for use in the clustering analysis.

FIG. 5 is a flow diagram illustrating one embodiment for selecting focal categories in accordance with one embodiment for clustering analysis. As shown in block 410, the process begins by selecting the node highest in the tree and not yet evaluated. As shown in blocks 420 and 445, if the percent difference between the raw weight plus the ancestor weight to the descendant weight is greater than the depth cut-off percent parameter, then that node is selected as the focal point for the cluster. Table 5 shows raw plus ancestor weights and descendant weights for each node of the set of nodes in the example of FIG. 3.

TABLE 5

| Node Name | Raw Weight + Ancestor Weight | Descendant Weight |
|---|---|---|
| A | 10 | 105 |
| C | 21.9 | 0 |
| C' | 16.7 | 60 |
| C" | 16.4 | 0 |
| D | 26.7 | 50 |
| F | 76.7 | 0 |
| H | 30 | 0 |
| K | 10 | 0 |

Starting with $node_A$ in tree structure 220, the percentage of the raw plus ancestor weight to the descendant weight is less than the percentage cut-off weight of fifty-five percent (55%). Thus, for ontology 220, $node_A$ is not selected as the focal point for this cluster. In tree structure 230, the process compares the percentage of the raw plus ancestor weight of $node_H$ to the descendant weight of $node_H$. In this case, if the depth cut-off percent parameter is less than 66%, then $node_H$ is selected as the focal point of the cluster on ontology 230.

As shown in blocks 420 and 430 of FIG. 5, if the percentage of the raw plus ancestor weight of the selected node to the descendant weight is less than the depth cut-off percent parameter, then child nodes, in that ontology, are evaluated. As shown in blocks 450 and 460, the child nodes are selected and ordered, in a descending order, by total weight (i.e., raw weight+ancestor weight+descendant weight). For ontology 220 of FIG. 3, the descending order for the remaining child nodes is:

$Node_{C'}$ (81.9), $Node_C$ (21.9), and $Node_{C''}$ (16.4).

As shown in block 470 of FIG. 5, the percent of the smaller of the pair to the Larger (e.g. an actual percentage difference) is calculated for each adjoining pair of child nodes. For the ontology 220 of FIG. 3, C' is twenty-six percent (26%) of the value of $node_C$ and C" is seventy four percent (74%) of the value of $node_C$. As shown in block 480 of FIG. 5, an average expected percent difference or drop for all of the child nodes is computed as 100—(100/# Items left on the list) (e.g., a thirty three and a third (33.3%) for the example of FIG. 3).

In general, cluster analysis 190 (FIG. 1) utilizes the calculated percent differences and the breadth cut-off percentage to select child nodes as candidates for the focal point node, as shown in block 490 of FIG. 5. This process may result in selection of more than a single focal node from the list of child nodes. The selected child nodes are utilized in the process starting again at block 410 as shown in FIG. 5.

Knowledge Base

In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse.

In general, in normalization processing 120 (FIG. 7), given a term, the goal is to analyze and manipulate its language dependent features until a language independent ontological representation is found. The knowledge base 155 consists of concepts, general categories, and cross-references. Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry links that are generated by the associations that form a directed graph.

The ontology in the knowledge base 155 contains only canonical nouns and noun phrases, and it is the normalization processing 120 (FIG. 7) that provides mappings from non-nouns and non-canonical nouns. The organization of the knowledge base 155 provides a world view of knowledge, and therefore the ontology actually contains only ideas of canonical nouns and noun phrases. The text representation of those ideas is different in each language, but the ontological location of the ideas in the knowledge base 155 remains the same for all languages.

The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5.

There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical forms mapped to the language independent concepts stored as the knowledge base 155. The concept is any idea found in the real world that can be classified or categorized as being closely associated with one and only one knowledge base 155 general category. Similarly, any canonical form in a particular language can map to one and only one concept. For example, there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

Cross references are mappings between general categories that are not directly ancestrally related, but that are close to each other ontologically. Direct ancestral relationship means parent-child, grandparent-grandchild, great grandparent-great grandchild, etc. Cross references reflect a real-world relationship or common association between the two general categories involved. These relationships can usually be expressed by universal or majority quantification over one category. Examples of valid cross references and the relationships are shown in Table 6.

TABLE 6 oceans --> fish (all oceans have fish)
belief systems --> moral states (all belief systems address moral states)
electronics --> physics (all electronics deals with physics)
death and burial --> medical problems (most cases of death and burial are caused by medical problems)

Cross references are not automatically bidirectional. For example, in the first entry of Table 6, although oceans are associated with fish, because all oceans have fish, the converse may not be true since not all fish live in oceans. The names for the general categories are chosen such that the cross references that involve those general categories are valid with the name or label choices. For example, if there is a word for fresh water fish in one language that is different than the word for saltwater fish, the oceans to fish cross reference is not valid if the wrong translation of fish is used. Although the knowledge base 155 is described as cross linking general categories, concepts may also be linked without deviating from the spirit and scope of the invention.

Figure 6:
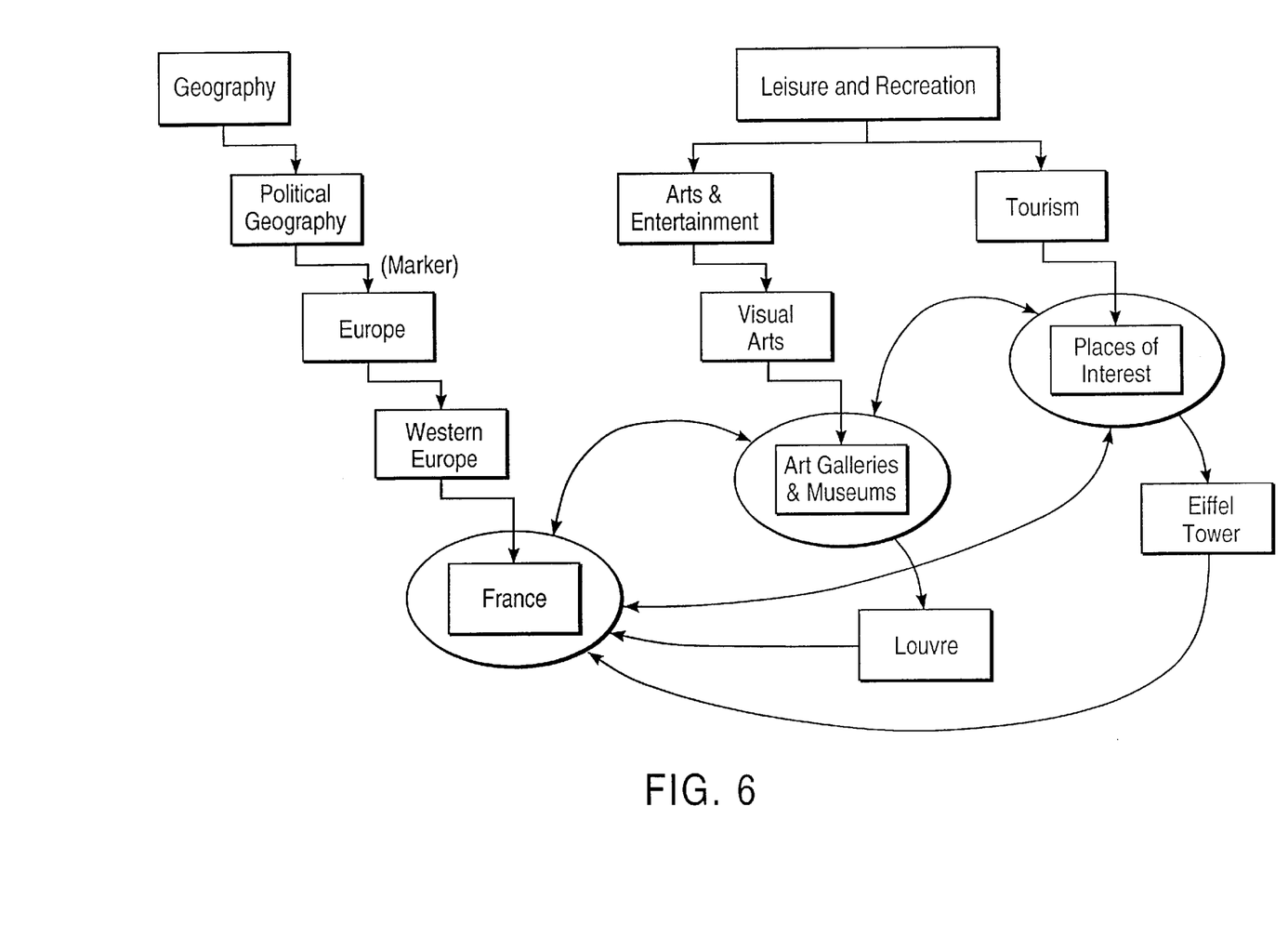
FIG. 6 illustrates an example portion of a knowledge base hierarchy including cross references among nodes.

FIG. 6 illustrates an example portion of a knowledge base including cross references and links among categories and terms. The classification hierarchy and notations shown in FIG. 6 illustrate an example that classifies a document on travel or tourism, and more specifically on traveling to France and visiting museums and places of interest. As shown in FIG. 6, the classification categories (e.g., knowledge catalog 560) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include linking and cross referencing among categories for which a linguistic, semantic, or usage association has been identified. For the example illustrated in FIG. 6, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

For this example, the knowledge base 155 indicates that the Louvre, a proper noun, is classified under the category "art galleries and museums", and further associates the term "Louvre" to the category "France."Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories, concepts and terminology. The "links" or "cross references" on the directed graph, which indicate the associations, is graphically depicted in FIG. 6 using lines and arrows. For the example shown in FIG. 6, the directed graph indicates that there is a linguistic, semantic, or usage association among the concepts "France", "art galleries and museums", and "places of interest."

Semantic Proximity

To rank the query feedback terms, semantic proximity among the focal categories or nodes and the query feedback terms is calculated (block 252, FIG. 2). For purposes of nomenclature, the focal nodes (i.e., those nodes in the knowledge base 155 selected during cluster analysis) are referred to as cluster nodes, and represented as $C[i]$, wherein i is an integer value that ranges between 1 and N and N represents the total number of cluster nodes. The weights or strengths associated with each cluster node are referred to as $W[i]$, wherein i is the same variable referred to in defining the cluster node (i.e., i ranges between 1 and N, where N is the total number of cluster nodes). Also, for purposes of nomenclature, the node of a category in a knowledge base associated with a query feedback term is referred to as "F." Using the above nomenclature, measuring semantic proximity may be referred to as establishing a quantitative measure of semantic proximity between F and the set C.

The knowledge base 155 includes three different types of links between any two nodes: (1) parent (2) child and (3) cross-reference. In one embodiment, to measure semantic proximity, the following weights are associated with each type of link as shown in Table 7.

TABLE 7

| Link Type | Weight |
|---|---|
| Parent | p |
| Child | q |
| XRef | r |

The weights p, q, and r are numeric values greater than or equal to 1.

To calculate a semantic proximity, the query feedback processing 185 (FIG. 1) first identifies the shortest path between query feedback term nodes and cluster nodes. Specifically, to identify the shortest path, for each C[i], the path with the least number of links, regardless of the link type, is located between F (query term node) to each of the focal nodes C[i]. However, this calculation may lead to multiple paths between a query feedback term node and a cluster node. Defining the paths identified as P[i][j], wherein j ranges between 1 and M[i], and M[i] is the total number of paths identified between the feedback node, F, and the cluster node C[i]. P[x][y] refers to the $y^{th}$ path identified above between the feedback node, F, and the focal node, C[i]. Each path in the set of P is composed of parent, and/or child, and/or cross-reference links.

For this embodiment, to compute the semantic proximity, another weight, referred as the self-link weight, is defined. A value, "s," is assigned for this self-link weight. The following pseudo-code defines steps for computing semantic proximity (SA) in accordance with one embodiment for query feedback processing.

```
SA = 0 /* initialize semantic proximity to zero */
for each x in 1..N /* for each cluster node */
{
    psd = 0 /* initialize path specific semantic proximity contribution */
    for each y in 1..M[x] /* for each path identified from F to
                 * cluster node C[x] */
    {
        tmp = W[x]/(s + (sum of weights associated with each link in path P[x][y]))
            if tmp > psd then /* find maximum */
                psd = tmp
    }
    increment SA by psd
}
```

Once semantic proximity is calculated, it is used to rank feedback terms. As discussed above, semantic proximity is directly proportional to the rank of the feedback term. Specifically, the higher the semantic proximity, the higher the feedback term is ranked.

In one embodiment, the values for the link weights are derived using empirical testing. The following constraints are used to prevent deterioration of the quality of ranking:

1. s<p
2. s<q
3. s<r

These constraints ensure that if F is equal to C[i], for some i between 1 and N then its contribution to the total semantic proximity between F and the set C is higher than the contribution to the total semantic proximity from the pair F and C[y], for some y between 1 and N, but y not equal to x. This also assumes that the weight W[x] is equal to W[y]. For example, one set of link weights that complies with the above constraints is listed in Table 8.

TABLE 8

| Weight | Values |
|---|---|
| p | 2 |
| q | 2 |
| r | 2 |
| s | 1 |

Content Processing System

FIG. 7 is a block diagram illustrating one embodiment for a content processing system. In general, the content processing system 110 analyzes words and phrases to identify the thematic content. For example, the content processing system 110 analyzes the document set 130 and generates the document theme vector 160. For this embodiment, the content processing system 110 includes a linguistic engine 700, a normalization processing 120, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. Pat. No. 5,694,523, inventor Kelly Wical, entitled "Content Processing for Discourse", filed May 31, 1995, that includes an Appendix D, entitled "Analysis Documentation", which is expressly incorporated herein by reference.

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phrases for each sentence in the documents, the context of the documents is defined. The chaos loop processor stores information in the form of the contextual tags 720. U.S. Pat. No. 5,694,523, inventor Kelly Wical, entitled "Content Processing System for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. Pat. No. 5,694,523, inventor Kelly Wical, issued Dec. 2, 1997, entitled "Content Processing System for Discourse", filed May 31, 1995.

As shown in FIG. 7, the morphology section 770 contains the knowledge catalog 560 and a lexicon 760. In one embodiment, the knowledge catalog 560 identifies categories for the document themes. For this embodiment, the knowledge catalog 560 contains categories, arranged in a hierarchy, that reflect a world view of knowledge. Appendix A of U.S. Pat. No. 5,694,523, inventor Kelly Wical, issued Dec. 2, 1997 entitled "Content Processing System for Discourse", filed May 31, 1995, is an example of a knowledge catalog for use in classifying documents.

In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. Pat. No. 5,694,523, inventor Kelly Wical, entitled "Content Processing System for Discourse", filed May 31, 1995.

The topics and content carrying words 737 are input to the normalization processing 120. In part, the normalization processing 120 processes the content carrying words for direct use with the knowledge catalog 560 and knowledge base 155. Specifically, the normalization processing 120 generates, as appropriate, canonical, nominal or noun form of each content carrying word, as well as the count sense and mass sense of the word. Furthermore, the normalization processing 120 determines, from the knowledge catalog 560, which content carrying words are non ambiguous.

As shown in FIG. 7, the theme vector processor 750 receives the thematic tags 730 and contextual tags 720 from the structured output 710. In addition, the non ambiguous content carrying words from the normalization processing 120 are input to the theme vector processor 750. The content carrying words may include single words or phrases. The content carrying words output from the normalization processing 120 have been converted to the noun or nominal form. In general, the theme vector processor 750 presents a thematic profile of the content of each document (e.g., generates the document theme vector 160 including classifying the documents in the knowledge catalog 560. To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 560, generates a theme concept for each theme term by mapping the theme terms to categories in the knowledge catalog 560. Thus, the theme concepts indicate a general topic or category in the knowledge catalog 560 to identify the content of each document. In addition, the theme vector processor 750 generates, for each theme term, an importance number, a theme strength, and an overall capacity weight of collective content importance.

In one embodiment, the theme vector processor 750 executes a plurality of heuristic routines to generate the theme strengths for each theme. U.S. Pat. No. 5,694,523, inventor Kelly Wical, entitled "Content Processing System for Discourse", contains source code to generate the theme strengths in accordance with one embodiment for theme vector processing. Also, a further explanation of generating a thematic profile is contained in U.S. Pat. No. 5,694,523.

Computer System

Figure 8:
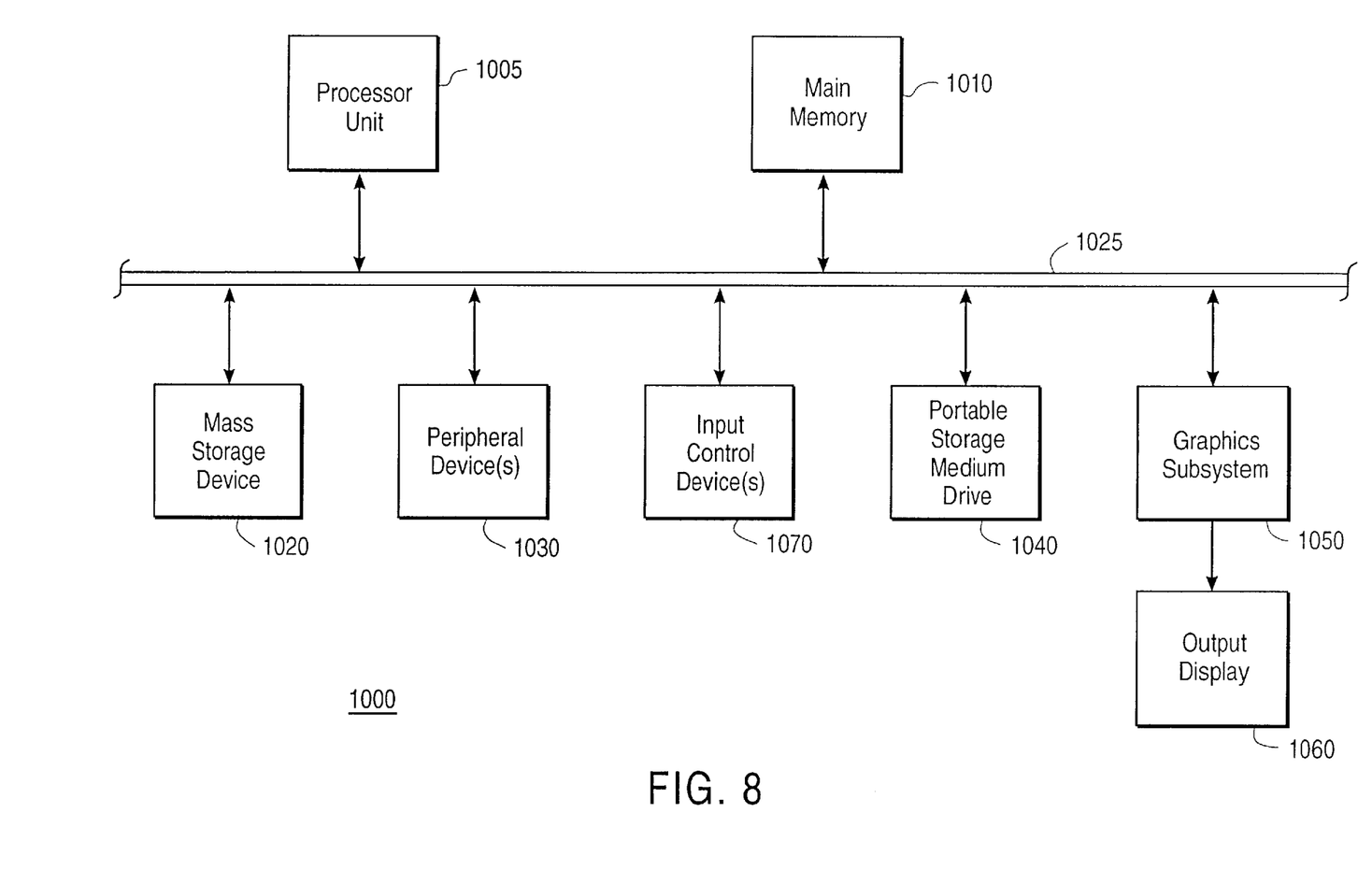
FIG. 8 illustrates a high level block diagram of a general purpose computer system in which the information retrieval system of the present invention may be implemented.

FIG. 8 illustrates a high level block diagram of a general purpose computer system in which the information retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the information retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 8 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the information retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the information retrieval system software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the information retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The information retrieval system may be implemented in either hardware or software. For the software implementation, the information retrieval system is software that includes a plurality of computer executable instructions for implementation on a general purpose computer system. Prior to loading into a general purpose computer system, the information retrieval system software may reside as encoded information on a computer readable medium, such as a magnetic floppy disk, magnetic tape, and compact disc read only memory (CD-ROM). In one hardware implementation, the information retrieval system may comprise a dedicated processor including processor instructions for performing the functions described herein. Circuits may also be developed to perform the functions described herein. The knowledge catalog 560 and knowledge database 155 may be implemented as a database stored in memory for use by the information retrieval system.

Although the present invention has been described in terms of specific exemplary embodiments, it will be appreciated that various modifications and alterations might be made by those skilled in the art without departing from the spirit and scope of the invention.

What is claimed is:

1. A computer system comprising:

storage medium for storing a knowledge base, comprising a plurality of nodes that represent concepts, to define conceptual relationships among said nodes;

a user input device for receiving user queries;

processor unit for processing said user queries to identify a plurality of query topics related to said query, to identify nodes in said knowledge base with concepts that correspond to said query topics, to select at least one focal node from said knowledge base, wherein a focal node represents a concept, as defined by said relationships in said knowledge base, conceptually most representative of said query topics, to determine conceptual proximity between said focal node and said nodes identifying said query topics, and to rank said query topics from a first topic closest in conceptual proximity to said focal node to a last topic furthest in conceptual proximity to said focal node; and an output display for displaying said topics, as query feedback, in said information retrieval system ranging from said first topic to said last topic.

2. A method for ranking query feedback terms in an information retrieval system, said method comprising the step of:

storing a knowledge base that comprises a plurality of nodes, depicting terminological concepts, arranged to reflect semantic relationships among said nodes;

processing a query to identify a plurality of documents related to said query;

processing a query to identify query feedback terms;

identifying a plurality of themes from said documents;

identifying a plurality of theme nodes in said knowledge base by lining said themes to a set of nodes with corresponding terminological concepts;

identifying at least one cluster of theme nodes;

selecting a focal node from said knowledge base for said at least one cluster of said theme nodes, wherein said focal node represents a terminological center, as defined by said relationships of nodes in said knowledge base, in a cluster of said theme nodes;

identifying a plurality of query feedback term nodes in said knowledge base by linking said query feedback terms with corresponding terminological concepts;

determining conceptual proximity, as depicted by relationships among said nodes of said knowledge base, between said focal node and said query feedback term nodes;

ranking said query feedback terms according to conceptual proximity, ranging from a first term with the closest conceptual proximity to said focal node to a last term with the furthest conceptual proximity to said focal node; and displaying said query feedback terms in said information retrieval system ranging from said first term to said last term.

3. A method for ranking query feedback terms in an information retrieval system, said method comprising the step of:

storing a knowledge base, comprising a plurality of nodes that represent concepts, to define conceptual relationships among said nodes;

processing a query to identify a plurality of topics related to said query;

processing said query to identify a plurality of query feedback terms, identifying topic nodes in said knowledge base with concepts that correspond to said topics identified;

selecting at least one focal node from said knowledge base based on said topic nodes, wherein a focal node represents a concept, as defined by said relationships in said knowledge base, conceptually most representative of said query topics;

identifying query feedback term nodes in said knowledge base with concepts that correspond to said query feedback terms;

determining conceptual proximity between said focal node and said query feedback term nodes;

ranking said query feedback terms starting from a first term closest in conceptual proximity to said focal nodes; and displaying said query feedback terms in said information retrieval system starting from said first term.

4. The method as set forth in claim 3, wherein the step of processing a query to identify a plurality of topics comprises the steps of:

selecting a plurality of documents relevant to said query; and selecting said topics from said documents.

5. The method as set forth in claim 4, wherein the step of selecting said topics from said documents comprises the step of determining one or more themes from said documents, wherein said themes define at least a portion of the thematic content of said documents.

6. The method as set forth in claim 3, wherein the step of storing a knowledge base comprises the step of storing a knowledge base comprising a directed graph that associates terminology having a lexical, semantic or usage association through parent, child and cross-reference links.

7. The method as set forth in claim 3, wherein:
the step of selecting at least one focal topic from said knowledge base comprises the steps of:
selecting nodes from said knowledge base for terminology that corresponds to said topics identified;
determining focal nodes from said nodes selected, wherein said focal nodes generally reflect a center of a cluster formed by selection of said nodes selected; and
the step of ranking said query feedback terms comprises the steps of:
determining a distance between said focal node and said query feedback nodes in said knowledge base; and
ranking said query feedback terms, corresponding to said query feedback nodes, based on their respective distances.

8. A computer readable medium comprising a plurality of instructions, which when executed, causes a computer to perform the steps of:
storing a knowledge base, comprising a plurality of nodes that represent concepts, to define conceptual relationships among said nodes;
processing a query to identify a plurality of topics related to said query;
processing said query to identify a plurality of query feedback terms,
identifying topic nodes in said knowledge base with concepts that correspond to said topics identified;
selecting at least one focal node from said knowledge base based on said topic nodes, wherein a focal node represents a concept, as defined by said relationships in said knowledge base, conceptually most representative of said query topics;
identifying query feedback term nodes in said knowledge base with concepts that correspond to said query feedback terms;
determining conceptual proximity between said focal node and said query feedback term nodes;
ranking said query feedback terms starting from a first term closest in conceptual proximity to said focal node; and
displaying said query feedback terms in said information retrieval system starting from said first term.

9. The computer readable medium as set forth in claim 8, wherein the step of processing a query to identify a plurality of query topics comprises the steps of:
selecting a plurality of documents relevant to said query; and
selecting said topics from said documents.

10. The computer readable medium as set forth in claim 9, wherein the step of selecting said topics from said documents comprises the step of determining one or more themes from said documents, wherein said themes define at least a portion of the thematic content of said documents.

11. The computer readable medium as set forth in claim 9, wherein the step of storing a knowledge base comprises the step of storing a knowledge base comprising a directed graph that associates terminology having a lexical, semantic or usage association through parent, child and cross-reference links.

12. The computer readable medium as set forth in claim 8, wherein:
the step of selecting at least one focal topic from said knowledge base comprises the steps of:
selecting nodes from said knowledge base for terminology that corresponds to said topics identified;
determining a focal node from said nodes selected, wherein said focal node generally reflects a center of a cluster formed by selection of said nodes selected; and
the step of ranking said query feedback terms comprises the steps of:
determining a distance between said focal node and said query feedback nodes in said knowledge base; and
ranking said query feedback terms, corresponding to said query feedback nodes, based on their respective distances.

* * * * *